US005926130A

United States Patent [19]

Werntz

[11] Patent Number: 5,926,130

[45] Date of Patent: Jul. 20, 1999

[54] DIGITAL SPACECRAFT ANTENNA TRACKING SYSTEM

[75] Inventor: Paul C. Werntz, Playa Del Rey, Calif.

[73] Assignee: Hughes Electronics Corporation, El Segundo, Calif.

[21] Appl. No.: 09/112,851

[22] Filed: Jul. 10, 1998

[51] Int. Cl.[6] .......... H04B 7/185

[52] U.S. Cl. .......... 342/354; 342/359; 342/372

[58] Field of Search .......... 342/354, 359, 342/372

[56] References Cited

U.S. PATENT DOCUMENTS

| | | | |
|---|---|---|---|
| 4,963,890 | 10/1990 | Perrotta et al. | 342/359 |
| 5,274,382 | 12/1993 | Wills et al. | 342/359 |
| 5,521,604 | 5/1996 | Yamashita et al. | 342/359 |
| 5,754,139 | 5/1998 | Turcotte et al. | 342/373 |

*Primary Examiner*—Theodore M. Blum

*Attorney, Agent, or Firm*—Georgann S. Grunebach; M. W. Sales

[57] ABSTRACT

A digital spacecraft antenna tracking system and method are provided which utilize an array of antenna feed elements oriented relative to a shaped spacecraft reflector antenna system each of which generates an output signal corresponding to a received incident signal. The outputs can be processed by a mixer/multiplexer (M/MUX) before processing by a digital tracking control receiver. The direction of a beacon signal incident on the spacecraft reflector antenna system is obtained by the TCR by comparing the beacon response of the M/MUX to a set of premeasured responses to incident signals having a known direction or orientation relative to a reference tracking grid. The premeasured responses are stored in a memory as a set of reference responses. Once the direction of the signal is obtained, the TCR assigns control voltages which are used by the spacecraft to steer the spacecraft antenna to a desired pointing direction relative to the beacon signal.

16 Claims, 1 Drawing Sheet

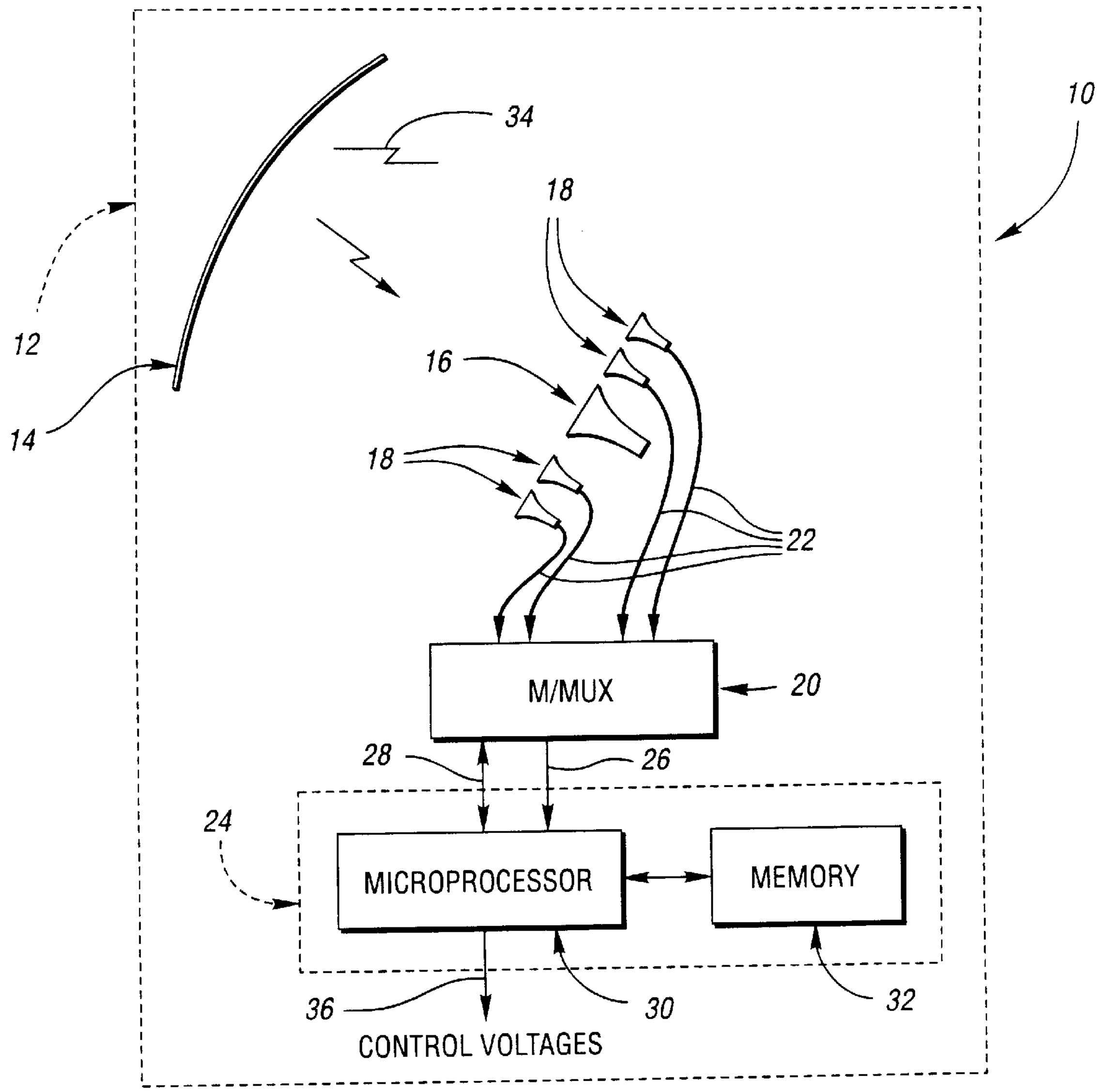
10
34
18
12
16
14
18
22
M/MUX
20
28
26
24
MICROPROCESSOR
MEMORY
36
30
32
CONTROL VOLTAGES

DIGITAL SPACECRAFT ANTENNA TRACKING SYSTEM

TECHNICAL FIELD

The present invention generally relates to spacecraft antenna tracking systems, and more particularly to spacecraft antenna tracking systems which can be used in conjunction with shaped or parabolic reflector antenna elements.

BACKGROUND ART

Generally, known spacecraft antenna tracking systems have been analog based. Such analog tracking systems typically consist of one or more arrays of feeds and a beam forming network (BFN) that are used in conjunction with a spacecraft reflector antenna system and connected to a modulator assembly (MA) and an analog tracking control receiver (TCR). Location of the elements in the feed array and the design of the BFN cause the reflector antenna system to produce a sum beam, and a null beam. For an incident beacon signal, the MA compares the phase and amplitude response of the sum beam to the phase and amplitude responses of the null beams and produces an amplitude modulated signal. The amplitude modulated signal is demodulated by the analog TCR and appropriate spacecraft control voltages are produced in response thereto.

The design and implementation of such analog systems can be problematic due to the fact that the location and number of elements in the feed array and the BFN are different for each reflector system. This makes the design of such elements very difficult when used in conjunction with shaped reflectors. In addition, the sum beam and nulls must be shaped such that the MA produces a linear response over the tracking range. In general, an analog tracking system only produces a linear response over a narrow angular region, which degrades spacecraft tracking performance and reduces spacecraft bias range. Further, the phase and amplitude between the sum beam and the nulls is critical and requires extensive testing to allow appropriate processing of the sum beam and null outputs by the MA.

DISCLOSURE OF THE INVENTION

It is therefore an object of the present invention to provide a spacecraft antenna tracking system and method which minimizes or eliminates degradation when used in conjunction with a shaped reflector.

It is another object of the present invention to provide a spacecraft antenna tracking system and method which is less sensitive to feed locations, thereby allowing greater design flexibility.

It is a further object of the present invention to provide a digital spacecraft antenna tracking system and method.

In accordance with these and other objects, the present invention provides a digital spacecraft antenna tracking system having at least one shaped antenna element positioned on the spacecraft to receive an incident signal transmitted from a ground station, and a tracking array comprising a plurality of array antenna elements oriented relative to the at least one reflector antenna element. Each of the plurality of array antenna elements generates an output signal corresponding to the received incident signal. A tracking control receiver is connected to the output signals, and comprises a memory for storing a set of predetermined responses generated by a plurality of reference incident signals having a known direction relative to a reference grid. A processor is arranged to compare the output signals to the set of predetermined responses and determine the direction of the received incident signal based on the comparison.

The present invention further provides a method for tracking the direction of an incident signal transmitted by a ground station and received by a spacecraft antenna tracking system comprising positioning at least one reflector antenna element on the spacecraft to receive the incident signal, and orienting a tracking array comprising a plurality of array antenna elements relative to the antenna reflector element so that each of the plurality of array antenna elements generates an output signal corresponding to the received incident signal. A set of predetermined responses gene rated by a plurality of reference incident signals having a known direction relative to a reference grid are stored in a memory, and compared to the output signals to determine the direction of the received incident signal.

In accordance with one aspect of the present invention, the direction of a beacon signal incident on the spacecraft reflector antenna system can be obtained by the tracking control receiver (TCR) by comparing the response to the beacon signal with the stored set of premeasured responses. Once the direction of the signal is obtained, the TCR assigns control voltages which are used by the spacecraft to steer the spacecraft antenna to a desired pointing direction relative to the beacon signal. Further, in one embodiment, a multiplexer is connected to each of the plurality of array antenna elements for multiplexing the output signals into a single channel prior to processing by the tracking control receiver.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

The FIGURE is a block diagram of a digital spacecraft antenna tracking system in accordance with the present invention.

BEST MODE FOR CARRYING OUT THE INVENTION

Referring to the FIGURE, a digital spacecraft antenna tracking system 10 is integrated into a payload and operating system of a spacecraft 12. The spacecraft includes at least one shaped or parabolic reflector 14, a communication feed or feed array 16, and a plurality of feed elements 18 surrounding the communication feed 16 to form a tracking array. The remaining details regarding spacecraft 12 which are not related to tracking system 10 are otherwise conventional in arrangement and operation.

The tracking array feeds 18 are connected to a mixer/multiplexer (M/MUX) 20 via respective coaxial cables or waveguides 22. M/MUX 20 is connected to a digital tracking control receiver (TCR) 24 via a coaxial cable 26 and a control harness 28. TCR 24 utilizes a microprocessor 30 and a programmable memory 32 as described in more detail below.

In operation, a signal 34 from a beacon located on the ground is reflected off of the shaped (or parabolic) reflector 14 (or multiple reflectors) and received by the elements 18 in the tracking array. The signal received by each element in the tracking array is transmitted to the M/MUX 20 through the waveguides 22. The M/MUX mixes the signals down to an intermediate frequency (IF) and multiplexes the signals so they can be transmitted over a single channel. The multiplexed signal is amplified and transmitted to the TCR 24 through coaxial cables 26. Timing and local oscillator (LO) signals are transmitted between the digital TCR and M/MUX by the wire harness 28. The digital TCR is arranged to demultiplex the signal and obtain the relative phase and amplitude response of each element 18 in the tracking array. As discussed in more detail below, the beacon direction is obtained by correlating the beacon responses to a lookup table of responses to signals from know directions stored in memory 32. Once the beacon direction is obtained, TCR 24 assigns steering control voltages that are transmitted to the spacecraft control system by a wire harness 36.

In accordance with one embodiment of the present invention, correlation between a calibrated tracking array response and the tracking array response to an arbitrary incident signal is obtained by taking the dot product between the eight dimensional vectors formed by the i and q responses of the four antenna elements 18 in the tracking array. Pointing errors are bounded by the angular distance between points used to calibrate the tracking array.

More specifically, the phase and amplitude for each element 18 in the tracking array is read corresponding to a signal generated from each direction having a predetermined orientation with respect to a reference grid that defines the tracking region, such as a 41×41 grid. For a 41×41 grid, the reference track directions are stored as $(az_i, el_i)$ where i=1 . . . 1681 (41×41), and the response to each element in the tracking array is given by:

n=1 . . . 4

$$Iamp_{n,i}=amp_n(az_i,el_i)*\cos(phase_n(az_i,el_i))$$

$$Qamp_{n,i}=amp_n(az_i,el_i)*\sin(phase_n(az_i,el_i))$$

Therefore, for four horns in the tracking array feed, the I and Q terms produce an eight-dimensional reference response vector for each of the 1681 points in the reference grid.

The reference response vectors must be normalized by the response of at least one of the horns. In this case, the normalization is with respect to the vector sum of all the horn responses:

$$norm_i = \sum_{n=i}^{4} \sqrt{(Iampn_{n,i})^2 + (Qamp_{n,i})^2}$$

The terms in the final eight-dimensional tracking reference response vector for each reference grid point are given by:

$$trackref_{i,1} = \frac{Iamp_{1,i}}{norm_i},\ trackref_{i,2} = \frac{Qamp_{1,i}}{norm_i}$$

$$trackref_{i,3} = \frac{Iamp_{2,i}}{norm_i},\ trackref_{i,4} = \frac{Qamp_{2,i}}{norm_i}$$

$$trackref_{i,5} = \frac{Iamp_{3,i}}{norm_i},\ trackref_{i,6} = \frac{Qamp_{3,i}}{norm_i}$$

$$trackref_{i,7} = \frac{Iamp_{4,i}}{norm_i},\ trackref_{i,8} = \frac{Qamp_{4,i}}{norm_i}$$

The reference vector terms are stored in memory 32 along with the corresponding grid directions $(az_i, el_i)$.

For any signal received from within the tracking region, the normalized tracking response vector is obtained by the same manner used for the reference response vectors:

$$track_1 = \frac{Iamp_1}{norm},\ track_2 = \frac{Qamp_1}{norm}$$

$$track_3 = \frac{Iamp_2}{norm},\ track_4 = \frac{Qamp_2}{norm}$$

$$track_5 = \frac{Iamp_3}{norm},\ track_6 = \frac{Qamp_3}{norm}$$

$$track_7 = \frac{Iamp_4}{norm},\ track_8 = \frac{Qamp_4}{norm}$$

To obtain the tracking direction, a dot product is taken between the set of eight-dimensional reference response vectors and the eight-dimensional response vector for the signal incident from within the tracking region.

$$track * trackref_i = \sum_{j-i}^{8} track_j * trackref_{i,j} \quad \text{for } i = 1 \ldots 16$$

The signal direction is taken by finding the value i=inc for which the dot product is maximum and the obtaining $(az_{inc}, el_{inc})$ from the memory 32. Precision is limited to the angular distance between points in the reference grid. Better precision can be obtained by interpolation.

The tracking system of the present invention exhibits superior performance compared to conventional "sum and difference" tracking systems, and does not require a beam forming network. Further, the digital tracking system of the present invention does not experience degradation when used with shaped reflector antenna systems, and produces a linear response over a greater angular region than is possible with conventional analog tracking systems. Finally, efficiency in memory use can be increased by concentrating the calibration points near the area of interest and using sparse coverage for other directions, possibly extending to the edge of the geosphere.

While the best mode for carrying out the invention has been described in detail, those familiar with the art to which this invention relates will recognize various alternative designs and embodiments for practicing the invention as defined by the following claims.

What is claimed is:

1. A digital spacecraft antenna tracking system comprising:

at least one reflector antenna element positioned on the spacecraft to receive an incident signal transmitted from a ground station;

a tracking array comprising a plurality of array antenna elements oriented relative to the at least one reflector antenna element, each of said plurality of array antenna elements generating an output signal corresponding to a received incident signal; and a tracking control receiver responsive to each of the outputs of the plurality of array antenna elements, said tracking control receiver comprising a memory for storing a set of predetermined responses generated by a plurality of reference incident signals having a known direction relative to a reference grid, and a processor arranged to compare the output signals to the set of predetermined responses and determine the direction of the received incident signal based on the comparison.

2. The system of claim 1 wherein said tracking control receiver is arranged to convert an amplitude and phase of each array antenna element output into respective i and q terms for each received incident signal.

3. The system of claim 2 wherein said set of predetermined responses comprise a set of reference response vectors formed from a converted i and q term for each output of said plurality of antenna elements, and the processor is arranged to produce a dot product between each i and q term for a received incident signal and each reference response vector.

4. The system of claim 3 wherein the direction of the received incident signal is determined to be the direction of the reference grid for which the dot product is a maximum.

5. The system of claim 1 further comprising a multiplexer connected to each of the plurality of array antenna elements for multiplexing the output signals into a single channel for the tracking receiver.

6. The system of claim 1 wherein said tracking control receiver is further arranged to generate a steering control voltage for use by a spacecraft control system in response to the determined direction of the received incident signal.

7. The system of claim 1 wherein the at least one reflector antenna element comprises a parabolic antenna.

8. The system of claim 1 wherein the received incident signal comprises a beacon signal.

9. The system of claim 1 wherein the at least one reflector antenna element comprises a shaped reflector antenna element.

10. A method for tracking the direction of an incident signal transmitted by a ground station and received by a spacecraft antenna tracking system comprising:

positioning at least one reflector antenna element on the spacecraft to receive the incident signal;

orienting a tracking array comprising a plurality of array antenna elements relative to the at least one reflector antenna element so that each of said plurality of array antenna elements generates an output signal corresponding to the received incident signal;

storing in a memory a set of predetermined responses generated by a plurality of reference incident signals having a known direction relative to a reference grid;

comparing the output signals to the set of predetermined responses; and determining the direction of the received incident signal bas ed on the comparison.

11. The method of claim 10 further comprising converting an amplitude and phase of each array antenna element output into respective i and q terms for the received incident signal.

12. The method of claim 11 wherein said set of p redetermined responses comprise a set of reference response vectors formed from converting an i and q term for the amplitude and phase of each output of said plurality of antenna elements in response to the incident signals having a known direction, and comparing the output signals to the set of predetermined responses comprises producing a dot product between each i and q term for a received incident signal and each reference response vector.

13. The method of claim 12 wherein the direction of the received incident signal is determined to be the direction of the reference grid for which the dot product is a maximum.

14. The method of claim 10 further comprising generating a steering control voltage for use by a spacecraft control system in response to the determined direction of the received incident signal.

15. The method of claim 10 further comprising increasing memory use efficiency by concentrating the known direction relative to the reference grid near of the reference incident signals to an area of particular interest.

16. The method of claim 10 further comprising multiplexing the outputs of each of the plurality of array antenna elements into a single channel before comparing the output signals to the set of predetermined responses.

* * * * *